Sept. 10, 1963          L. F. KOOISTRA          3,103,478

NUCLEAR REACTOR CONTROL ROD AND METHOD OF MAKING SAME

Filed Jan. 9, 1959          2 Sheets-Sheet 1

*INVENTOR.*
LAMBERT F. KOOISTRA
BY
ATTORNEY

Sept. 10, 1963 L. F. KOOISTRA 3,103,478
NUCLEAR REACTOR CONTROL ROD AND METHOD OF MAKING SAME
Filed Jan. 9, 1959 2 Sheets-Sheet 2
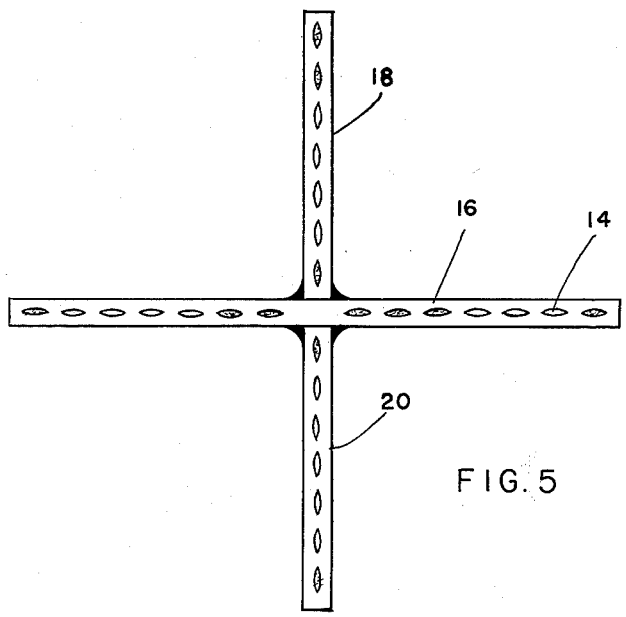
FIG. 5
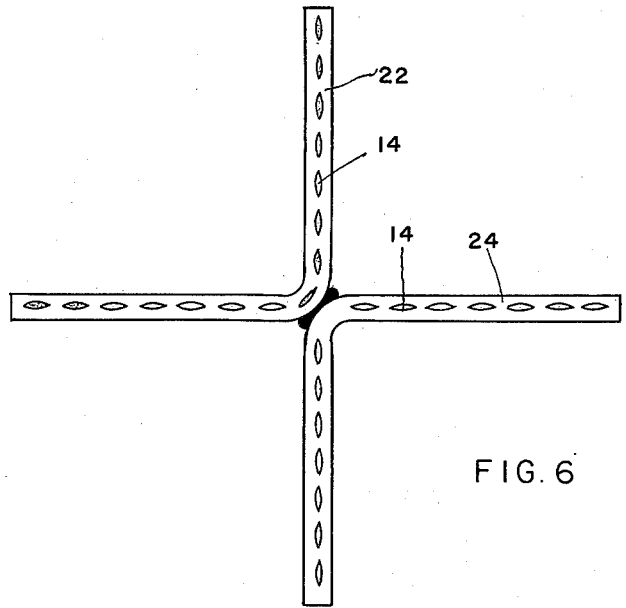
FIG. 6
INVENTOR.
LAMBERT F. KOOISTRA
BY 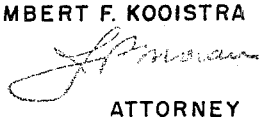
ATTORNEY

United States Patent Office 3,103,478
Patented Sept. 10, 1963

3,103,478
NUCLEAR REACTOR CONTROL ROD AND
METHOD OF MAKING SAME
Lambert F. Kooistra, Akron, Ohio, assignor to The Babcock & Wilcox Company, New York, N.Y., a corporation of New Jersey
Filed Jan. 9, 1959, Ser. No. 785,871
5 Claims. (Cl. 204—193.2)

This invention relates in general to nuclear reactors and more particularly, it relates to the control rods which contain a high percentage of high neutron absorbing material and which are moved in and out of the reactor to change reactivity thereof.

Control rods as used in the present-day nuclear reactors are put into a shape consistent with the fuel element configuration of the core, such that it occupies a minimum amount of volume and yet exposes the maximum amount of surface, so as to most effectively catch neutrons in the core. One of the problems of making effective control rods is that materials with high cross section are not generally suitable for reactor service, and if alloyed with other materials the resultant material does not have the strength characteristics necessary for reactor service. For instance, boron renders stainless steel exceedingly brittle when alloyed in sufficient quantities for control rod service. Hafnium and the rare earths are very scarce and extremely expensive. Accordingly, the present invention provides a control rod and method of making same wherein the high neutron absorbing material is placed in a plurality of holes drilled within an elongated strip of metal. The metal is then roll-formed with the high neutron absorbing material in the holes so as to provide a relatively flat metal strip having a plurality of severely elongated elliptical holes therein which are solidly filled with such high neutron absorbing material.

This invention further provides for the placing of the holes in overlapping relationship to each other such that in its final form the elliptical holes overlap and thus provide large areas essentially opaque to neutrons.

The various features of novelty which characterize the invention are pointed out with particularity in the claims annexed to and forming a part of this specification. However, for a better understanding of the invention, its operating advantages and specific objects attained by its use reference should be had to the accompanying drawings and descriptive matter in which are illustrated and described preferred embodiments of the invention.

Of the drawings:

FIGS. 5 and 6 illustrate two forms of cruciform control rods fabricated by alternate methods.

Figure 1:
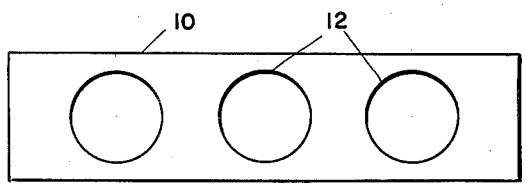
FIG. 1 is an end view of a metal strip prepared in accordance with the present invention.
Figure 2:
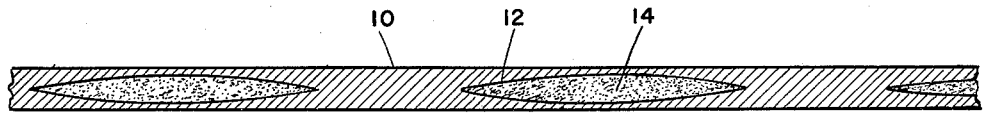
FIG. 2 is a cross section of the same strip after roll forming.
Figure 4:
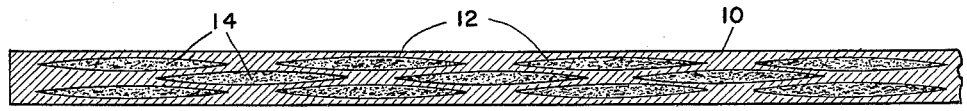
FIG. 4 is a cross section showing the strip of FIG. 3 after roll forming.

A rectangular strip of control rod material 10 is provided with a series of holes 12 which may be made by deep drilling. The holes are then filled with a high neutron absorbing material, such as boron, cadmium, hafnium, or chemical compounds thereof, and the holes are then closed off by welding the ends of the holes closed and the plate is brought up to rolling temperature. It is then rolled by conventional machinery to reduce its thickness as indicated by FIGS. 2 and 4.

The high neutron absorbing material 14 now resides in severely elongated ellipses in a relatively thin plate. This material is completely closed within a plate to thus reduce the loss therefrom of highly radioactive material during use. Further, there remains a matrix of wrought material sufficient to give the rod the necessary strength required for reactor service.

Figure 3:
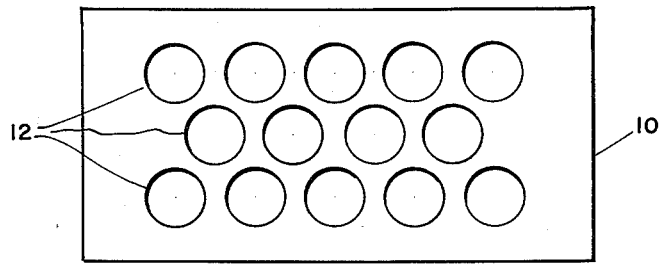
FIG. 3 is an end view of an alternate arrangement of the present invention.

As shown in FIG. 3 the holes 12 may be drilled in overlapping relationship to each other and in multiple rows, so that upon rolling the high neutron absorbing material 14 is then disposed along the length and width of the rod to present a substantially opaque surface to the neutrons in the reactor.

A typical reduction in accordance with the present invention would be to drill the holes in a plate or strip 2½ inches thick and subsequently reduce the plate by roll-forming to a thickness of ¼ inch. Typically, the control rod material may be a 300 series stainless steel. However, other materials having appropriate strength and corrosion properties may be substituted within the spirit of the invention. Typical among these may be aluminum and carbon steel.

With reference to FIGS. 5 and 6, there are shown the roll-formed control rods fabricated in a cruciform shape. In FIG. 5 there is shown a control rod formed of three roll-formed strips welded together. One strip 16 is formed with a high neutron absorbing material spaced farther apart in the central portion. Two other roll-formed strips 18, 20 are then welded to strip 16 at the central portion on opposite sides thereof. Alternatively, the rod may be formed as in FIG. 6 where two roll-formed strips 22, 24 are bent at a 90° angle and joined at the apex of the angle by welding.

Some of the fission products generated by neutron absorption are gaseous, for instance a fission product of neutron bombardment of boron is helium gas. There is some concern that these gases build up pressure within the control rod matrix and burst it. It is generally objectionable to release radioactive fission products, but in the case of helium or other harmless gaseous fission products, it would be advantageous to remove it from the interior of the control rod matrix. Accordingly, it is considered within the spirit of the invention that the body 10 of the rod may be composed of material as may be produced in a known manner by powder metallurgy techniques. The pososity of such metal allows diffusion of fission gases out of the rod without being detrimental to the corrosion resistance of the matrix material of the rod or affecting its strength.

Another arrangement for releasing gaseous fission products is to close off the end of the control rod strip by a similar porous metallic material.

An alternate construction is to leave space at the end of the elongated holes, filling it with a porous material before closing off the ends.

While in accordance with the provisions of the statutes I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:

1. A high neutron absorbing control rod for a nuclear reactor comprising an elongated solid rectangular strip of metal having a plurality of holes extending therethrough parallel to the longitudinal axis of the strip, each of said holes having the shape of a flattened circle, and a body of compacted high neutron absorbing material disposed within said holes, said holes arranged with their edges in non-communicating overlapping relation to each other.

2. A high neutron absorbing control rod for a nuclear reactor comprising an elongated solid rectangular strip of metal having a plurality of holes extending therethrough parallel to the longitudinal axis of the strip, each of said holes having the shape of a flattened circle, and a body of compacted high neutron absorbing material disposed within said holes, said holes arranged with their edges in non-communicating overlapping relation to each other, and each shaped in cross-section as a severely elongated ellipse.

3. A method of making a high neutron absorbing control rod for a nuclear reactor comprising drilling a plurality of holes through a longitudinally elongated strip of metal parallel to the longitudinal axis, filling said holes with a high neutron absorbing material, and roll forming said strip to a reduced thickness to produce a flattening of the round drilled holes to the form of a severaly elongated ellipse.

4. A method of making a high neutron absorbing control rod for a nuclear reactor comprising drilling a plurality of holes through a longitudinally elongated strip of metal parallel to the longitudinal axis, filling said holes with a high neutron absorbing material, closing said holes with malleable metal, and roll forming said strip to a reduced thickness to produce a flattening of the round drilled holes to the form of a severely elongated ellipse.

5. A method of making a high neutron absorbing control rod for a nuclear reactor comprising drilling a plurality of overlapping but not touching holes through a longitudinally elongated strip of metal parallel to the longitudinal axis, filling said holes with a high neutron absorbing material, closing said holes with malleable metal, and roll forming said strip to a reduced thickness to produce a flattening of the round drilled holes to the form of a severely elongated ellipse.

References Cited in the file of this patent
UNITED STATES PATENTS

| | | |
|---|---|---|
| 332,406 | Libby | Dec. 15, 1885 |
| 1,628,759 | Worrall | May 17, 1927 |
| 2,093,771 | Colwell | Sept. 21, 1937 |
| 2,375,334 | Valyi et al. | May 8, 1945 |
| 2,855,354 | Anderson | Oct. 7, 1958 |
| 2,861,035 | Zimm | Nov. 18, 1958 |
| 2,863,817 | Morris | Dec. 9, 1958 |
| 2,891,307 | Betteridge | June 23, 1959 |
| 2,983,994 | Johnson | May 16, 1961 |

OTHER REFERENCES

Nuclear Science and Engineering, vol. 4 (September 1958), pages 449–451 (part of article by Cunningham et al.).

Proceedings of the International Conference on the Peaceful Uses of Atomic Energy, August 8–20, 1955, vol. 9, pages 205–206.